United States Patent [19]

Lau et al.

[11] Patent Number: 5,830,385

[45] Date of Patent: Nov. 3, 1998

[54] METHOD OF MAKING LIQUID CRYSTAL COMPOSITE

[75] Inventors: Aldrich N. K. Lau, Palo Alto; Lanchi P. Vo, San Jose; Robert H. Reamey, Palo Alto; John R. Havens, Menlo Park; Kathleen Di Zio, Palo Alto, all of Calif.

[73] Assignee: Raychem Corporation, Menlo Park, Calif.

[21] Appl. No.: 773,803

[22] Filed: Jan. 24, 1997

Related U.S. Application Data

[63] Continuation of Ser. No. 360,503, Dec. 21, 1994, abandoned.

[51] Int. Cl.[6] ............................ C09K 19/52; C09K 19/00; G02F 1/13
[52] U.S. Cl. .................... 252/299.01; 252/299.1; 349/187
[58] Field of Search ............................ 252/299.01, 299.1; 349/187

[56] References Cited

U.S. PATENT DOCUMENTS

| | | | |
|---|---|---|---|
| 4,435,047 | 3/1984 | Fergason | 359/51 |
| 4,643,528 | 2/1987 | Bell, Jr. | 359/51 |
| 4,688,900 | 8/1987 | Doane et al. | 359/53 |
| 4,818,070 | 4/1989 | Gunjima et al. | 359/51 |
| 4,834,509 | 5/1989 | Gunjima et al. | 359/53 |
| 4,950,052 | 8/1990 | Fergason et al. | 359/51 |
| 4,992,201 | 2/1991 | Pearlman | 252/299.1 |
| 5,202,063 | 4/1993 | Andrews et al. | 264/4.6 |
| 5,206,747 | 4/1993 | Wiley et al. | 359/51 |
| 5,216,530 | 6/1993 | Pearlman et al. | 359/43 |
| 5,270,843 | 12/1993 | Wang | 359/52 |

(List continued on next page.)

FOREIGN PATENT DOCUMENTS

| | | | |
|---|---|---|---|
| 0313053 A2 | 4/1989 | European Pat. Off. | G02F 1/133 |
| 0421240 A2 | 4/1991 | European Pat. Off. | G02F 1/1333 |
| 0459281 A2 | 12/1991 | European Pat. Off. | |
| 0590984 A1 | 4/1994 | European Pat. Off. | C09K 19/54 |
| 3-288823 | 12/1991 | Japan | G02F 1/1333 |
| 4-007518 | 1/1992 | Japan | G02F 1/1333 |
| 4-240614 | 8/1992 | Japan | |
| 6-003652 | 1/1994 | Japan | G02F 1/1333 |
| WO 85/03944 | 9/1985 | WIPO | C09K 3/34 |
| WO 92/14184 | 8/1992 | WIPO | G02F 1/133 |

(List continued on next page.)

OTHER PUBLICATIONS

Adomenas et al., "Influence Of Plasticizers On The Values Of Operational Voltages Of Microencapsulated Liquid Crystals," *Mol. Cryst. Liq. Cryst.*, vol. 215, pp. 153–160 (1992).

Schadt et al., "Influence Of Solutes On Material Constants Of Liquid Crystals And On Electro–Optical Properties Of Twisted Nematic Displays," *J. Chem. Phys.*, vol. 65, No. 6, pp. 2224–2230 (1976).

Koval'chuk et al., "Electrooptical Effects In The Polymer Dispersed Nematic Liquid Crystals: Response Time," *Mol. Cryst. Liq. Cryst.* vol. 193, pp. 217–221 (1990).

Nomura et al., "Interfacial Interaction Between Nematic Liquid Crystal And Polymer In The Composite Film Consisting Of Nematic Liquid Crystal And Connected Polymer Microspheres." *Jap. J. Appl. Phys.*, vol. 30, No. 2, pp. 327–330 (Feb. 1991).

(List continued on next page.)

*Primary Examiner*—C. H. Kelly
*Attorney, Agent, or Firm*—Herbert G. Burkard; Yuan Chao

[57] ABSTRACT

A liquid crystal light composite in which discrete volumes of a liquid crystal material are dispersed in a matrix material is produced by a process in which a reactive additive formulation is added and photopolymerized. The reactive additive formulation includes mono- and multifunctional compounds in specified proportions and a photoinitiator. The reactive additive formulation reduces the operating field and may also improve other electro-optical properties.

20 Claims, 3 Drawing Sheets

U.S. PATENT DOCUMENTS

| | | | |
|---|---|---|---|
| 5,304,323 | 4/1994 | Arai et al. | 252/299.5 |
| 5,323,251 | 6/1994 | Coates et al. | 359/51 |
| 5,356,557 | 10/1994 | Jubb et al. | 252/299.01 |
| 5,376,302 | 12/1994 | Coates et al. | 252/299.01 |
| 5,378,391 | 1/1995 | Nakatani et al. | 252/299.01 |
| 5,384,066 | 1/1995 | Poetsch et al. | 252/299.01 |
| 5,401,437 | 3/1995 | Im | 252/299.01 |
| 5,405,551 | 4/1995 | Reamey et al. | 252/299.01 |
| 5,426,009 | 6/1995 | Coates et al. | 430/20 |
| 5,427,713 | 6/1995 | Wartenberg et al. | 252/299.5 |
| 5,437,811 | 8/1995 | Doane et al. | 252/299.01 |
| 5,496,497 | 3/1996 | Takiguchi et al. | 252/299.01 |
| 5,558,813 | 9/1996 | Akashi et al. | 252/299.01 |
| 5,571,448 | 11/1996 | Wartenberg et al. | 252/299.5 |

FOREIGN PATENT DOCUMENTS

| | | | |
|---|---|---|---|
| WO 93/09202 | 5/1993 | WIPO | C09K 19/54 |
| WO 93/18431 | 9/1993 | WIPO | G02F 1/1333 |
| WO 93/24589 | 12/1993 | WIPO | C09K 19/54 |
| WO 94/04958 | 3/1994 | WIPO | G02F 1/1333 |
| 9422508 | 11/1994 | WIPO . | |
| WO 95/29967 | 11/1995 | WIPO | C09K 19/54 |

OTHER PUBLICATIONS

Hirai et al., "Phase Diagram And Phase Separation in LC/Prepolymer Mixture," SPIE vol. 257 *Liq. Cryst. Displays and Applications*, pp. 2–8 (1990).

Derwent Abstract No. 94–079963/10 (abstract of JP 06/032761 (1994) (Dainippon Ink & Chemical)).

Derwent Abstract No. 93–221366/28 (abstract of JP 05/142520 (1993) (Alps Electric Co. et al.)).

Derwent Abstract No. 93–185554/23 (abstract of JP 05/113558 (1993) (Dainippon Printing Co.)).

Derwent Abstract No. 91–355581/49 (abstract of EP 0459281 (1992) (Merck Patent Gmbh)).

Ono et al., *Jpn. J. Appl. Phys.*, vol. 33 (1994), pp. 6268–6272, Part 1, No. 11 (Nov. 1994), "Electrooptical Properties of Poly(vinyl alcohol)/Liquid Crystal Composite Films with Added Photocured Polymers".

Ono et al., *Jpn. J. Appl. Phys.*, vol. 33 (1994), pp. 6637–6641, Part 1, No. 12A (Dec. 1994), "Effects of Anchoring Strength in Poly(vinyl alcohol)/Liquid Crystal Composite Films with Interface Layers".

Ono et al., *Jpn. J. Appl. Phys.*, Vol. 33 (1994), pp. L1778–L1781, Part 2, No. 12B (Dec. 1994), "Poly(vinyl alcohol)/Liquid Crystal Composite Films with Low Driving Voltage".

Derwent Abstract No. 89–280957/39 (abstract of JP 1/203494 (1989) (Fuji Photo Film)).

METHOD OF MAKING LIQUID CRYSTAL COMPOSITE

CROSS-REFERENCE TO RELATED APPLICATIONS

This application is a continuation of application Ser. No. 08/360,503, filed Dec. 21, 1994, now abandoned, the disclosure of which is incorporated herein by reference.

TECHNICAL FIELD OF THE INVENTION

This invention relates to additives for improving the electro-optical properties of liquid crystal composites used in light valves and methods for incorporating of such additives into the liquid crystal composites.

BACKGROUND OF THE INVENTION

It is known to make light valves whose electro-optically active element comprises a liquid crystal composite in which plural volumes or droplets of a liquid crystal material are dispersed within a matrix material such as a polymer. The liquid crystal material has also been described as being encapsulated or embedded in the matrix material. Exemplary disclosures include Fergason, U.S. Pat. No. 4,435,047 (1984) ("Fergason '047"); West et al., U.S. Pat. No. 4,685,771 (1987); Pearlman, U.S. Pat. No. 4,992,201 (1991); Dainippon Ink, EP 0,313,053 (1989). Such light valves may be used in displays and window or privacy panels.

The liquid crystal composite is disposed between transparent electrodes, which are respectively supported by substrates (e.g., glass or a transparent polymer). When no voltage is applied across the electrodes (the field-off state), incident light is substantially scattered and/or absorbed. When an appropriate voltage is applied across the electrodes (the field-on state), the liquid crystal composite changes its optical state to one in which incident light is substantially transmitted.

It has been proposed to include in the liquid crystal composite additives for the purpose of improving its electro-optical properties, its coatability onto the electrodes, and other performance characteristics. Exemplary disclosures include: Raychem, WO 93/18431(1993); copending commonly assigned applications of Reamey et al., No. 08/217581, filed Mar. 24, 1994; Havens et al., No. 08/217268, filed Mar. 24, 1994; and Lau, No. 08/222149, filed Mar. 31, 1994 ("Lau '149 application"); the disclosures of which are incorporated by reference. Among such additives are reactive additives, that is, additives which polymerize, oligomerize, cross-link, or otherwise chemically react after addition to the liquid crystal composite or a precursor therefore. Often, the reactive additives are acrylic or methacrylic compounds.

A common problem is the need to accommodate many different performance parameters. For a liquid crystal display driven by an active matrix, a performance parameter of predominant importance is the operating field $E_{90}$ (defined hereinbelow), because of limitations on the driving voltage attainable with existing active matrix drivers. Generally, an $E_{90}$ of less than about 1 volt/$\mu$m is desirable. But an additive which improves $E_{90}$ may adversely affect other performance parameters such as the switching speed or hysteresis, often to an unacceptable extent. Or, an additive may lower $E_{90}$ only over a narrow temperature range, resulting in an $E_{90}$ which is highly temperature dependent. Liquid crystal displays need to operate over a wide temperature range, typically between 5° and 55° C. An additive which improves performance at 25° C. but which is ineffective (or negatively effective) at 5° C. would not be practically useful, and vice-versa. Further, it is difficult to design drivers for a display whose operating field requirements are highly temperature dependent, for the driver then would have to be designed with a temperature variable driving voltage.

SUMMARY OF THE INVENTION

An object of this invention is to provide additive formulations for liquid crystal composites, which formulations lower the operating field $E_{90}$ without negatively affecting other performance parameters to an unacceptable extent. Another object of this invention is to provide additive formulations which lower $E_{90}$ over the entirety of a practically useful temperature range. Yet another object is to lower $E_{90}$ while simultaneously improving other performance parameters. Yet another object of this invention is to provide additive formulations which lead to a liquid crystal composite having operating fields $E_{90}$ which is relatively temperature independent over the operating temperature range.

This invention provides a method of making a liquid crystal light composite in which discrete volumes of a liquid crystal material are dispersed in a matrix material, comprising the steps of:

(a) providing an emulsion comprising plural discrete volumes of a liquid crystal material encapsulated in a matrix material carried in a carrier medium, the emulsion further comprising a reactive additive formulation comprising:

(I) between 83 and 93.3 weight percent of at least two monofunctional compounds of the structure

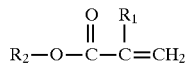

the group —$R_1$ being —$CH_3$ or —H and the group —$R_2$ being an alkyl, aryl, alkylaryl, arylalkyl, alkylcycloalkyl, cycloalkylalkyl, hydroxyalkyl, fluoroalkyl, or fluoroaryl group; wherein (A) each group —$R_2$ has a chain length of 6 or (B) at least one group —$R_2$ has a chain length other than six, in which latter event the distribution of chain lengths among the groups —$R_2$ is according to the following table

| Mole Percent | Chain Length |
|---|---|
| 5 to 90 | ≦5 |
| 10 to 95 | >5 | the mole percent's being based on the total amount of monofunctional compounds;

(II) between 5 and 25 weight percent of at least one multifunctional compound having acrylic or methacrylic functionality and being derived from diols or polyols containing aliphatic, aromatic, ester, epoxy, amide, imide, carbamate, or mesogenic segments; and (III) between 0.1 and 5.0 weight percent of at least one photoinitiator; the weight percent's being based on the combined amounts of monofunctional compounds, multifunctional compound, and photoinitiator;

(b) photopolymerizing the monofunctional and multifunctional compounds in the reactive additive formulation;

(c) applying a coating of the emulsion onto a substrate; and (d) drying the coating by permitting the carrier medium to evaporate.

Further, this invention also provides a composition of matter consisting of the reactive additive formulation as defined above.

BRIEF DESCRIPTION OF THE DRAWING(S)

FIGS. 1 through 4 compare liquid crystal composite light valves according to this invention against reference liquid crystal composite light valves.

FIGS. 5 and 6 show the effect of monofunctional compound chain length on the homeotropic transition temperature and the operating field of liquid crystal composite light valves.

DESCRIPTION OF THE PREFERRED EMBODIMENTS

Figure 1:
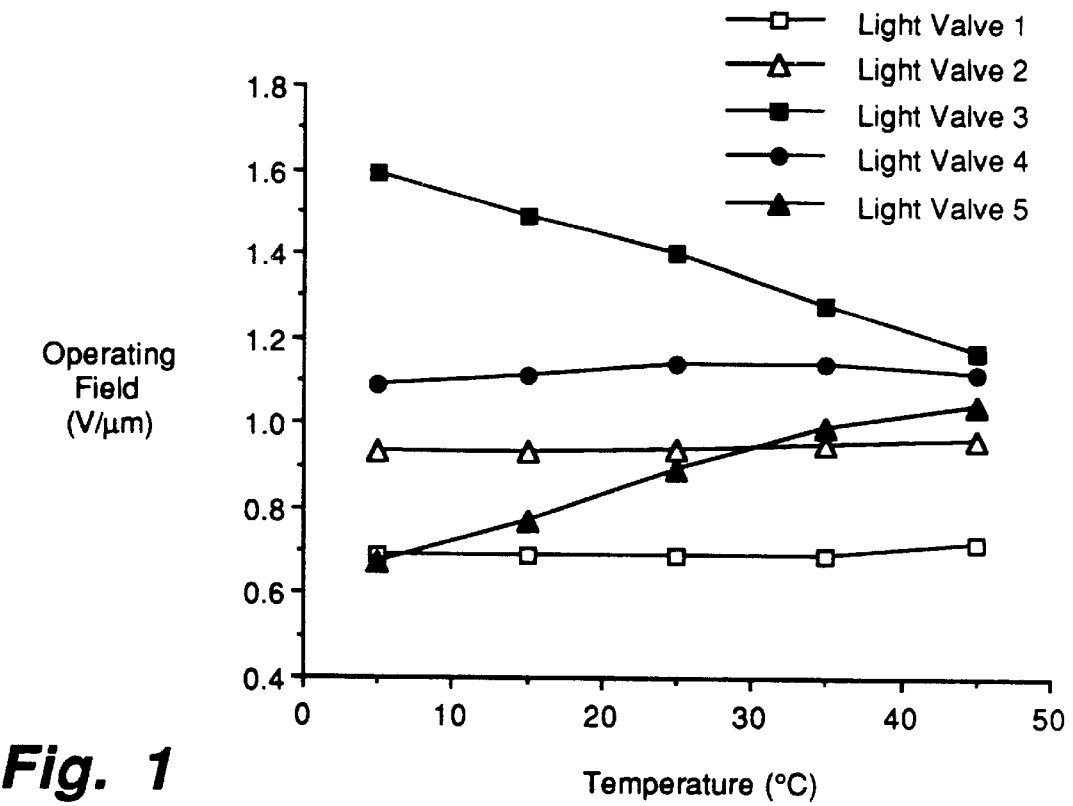
Figure 2:
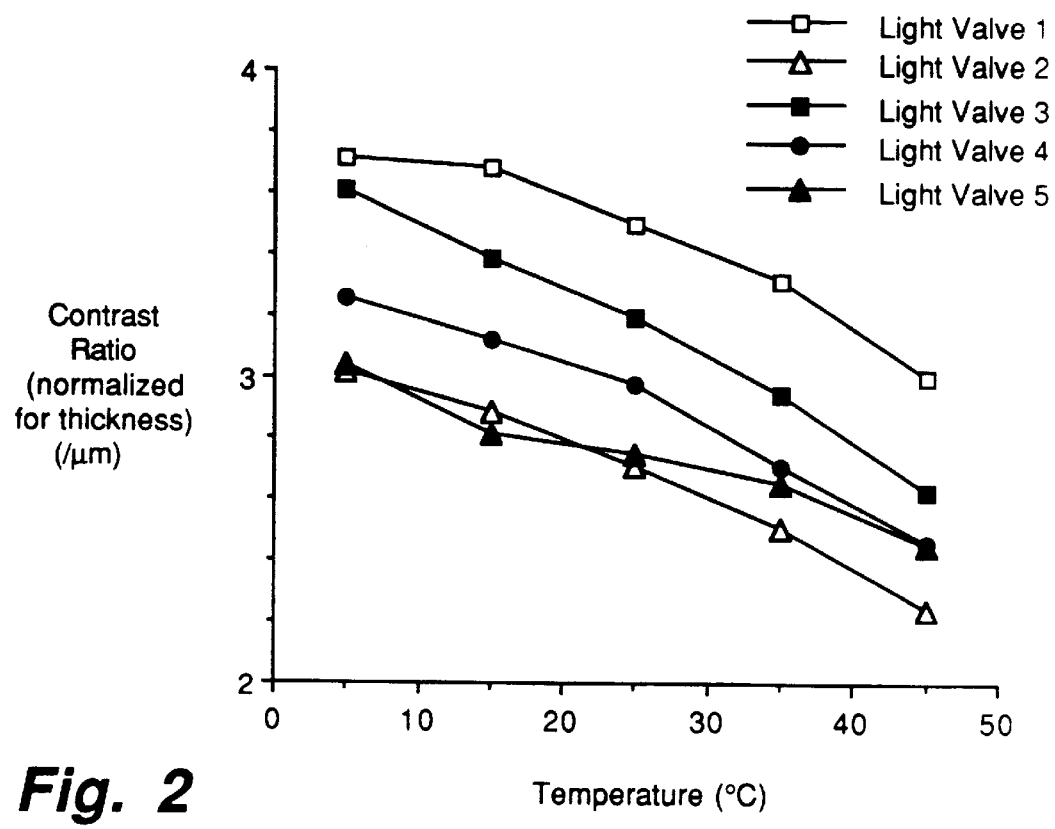
Figure 3:
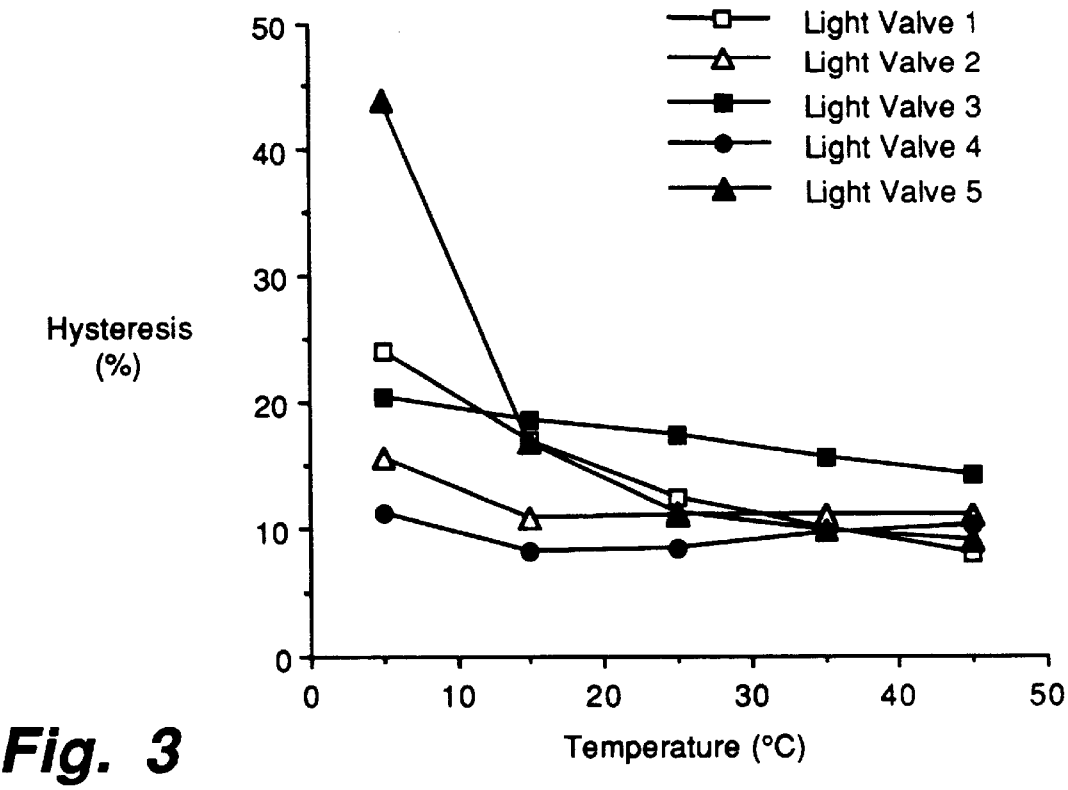

By using the additive formulations of this invention, one can lower the operating field $E_{90}$ over a practically useful temperature range without unacceptably affecting other performance parameters. In some instances some of the other performance parameters are actually improved. Further, $E_{90}$ exhibits less sensitivity to temperature. The additive formulation is preferably used in an amount of 5 to 30, more preferably 10 to 25, parts by weight per 100 parts weight of liquid crystal material (parts per hundred, or phr).

We have discovered that the type and relative proportions of the monofunctional and multifunctional compounds and the chain length of the group —$R_2$ in the monofunctional compounds unexpectedly play key roles in the effectiveness of the additive formulation. It is important that the reactive additive formulation not consist of monofunctional compounds whose groups —$R_2$ all have the same chain length, except when the chain length is 6. When the groups —$R_2$ have chain lengths other than 6, the mole % of groups —$R_2$ having a chain length less than or equal to 5 should be between 5 and 90 mole %, preferably between 20 and 70 mole %. The "chain length" of a group —$R_2$ means the length of the longest chain of atoms in the group —$R_2$ (usually carbon but permissibly other polyvalent atoms such as oxygen or nitrogen), as determined by counting, starting at the atom in the group —$R_2$ which bonded to the ether oxygen (—O—) in the monofunctional compound, towards the polyvalent atom which is most distant from such starting atom. "Most distant" refers to distance in terms of the number of intervening bonds, as opposed to absolute distance. References to ranges of chain lengths herein are inclusive—e.g., a range between 2 and 5 includes the values 2 and 5.

The groups —$R_1$ and —$R_2$ may be independently varied. In one monofunctional compound the group —$R_1$ may be —$CH_3$ while in another monofunctional compound the group —$R_1$ may be —H. Those skilled in the art will appreciate that this is equivalent to stating that monofunctional compounds may be a mixture of acrylic and methacrylic compounds.

Exemplary suitable monofunctional compounds are listed below. To further illustrate the concept of chain lengths, the chain length of the group —$R_2$ of each of the listed monofunctional compounds is also provided.

| Monofunctional Compound | Chain Length | Reference |
|---|---|---|
| 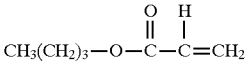 | 4 | (I) |
| 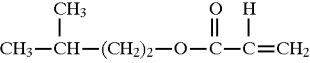 | 4 | (II) |
| 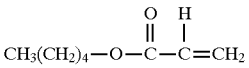 | 5 | (III) |
| 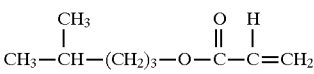 | 5 | (IV) |
| 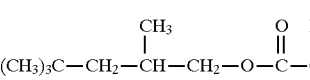 | 5 | (V) |
| 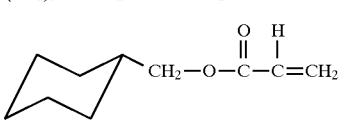 | 5 | (VI) |
| 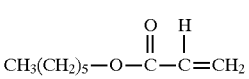 | 6 | (VII) |
|  | 6 | (VIII) |
| 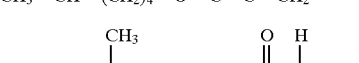 | 6 | (IX) |
| 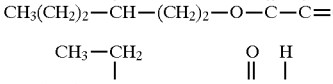 | 6 | (X) |
| 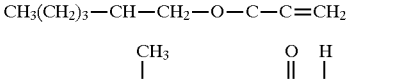 | 6 | (XI) |
| 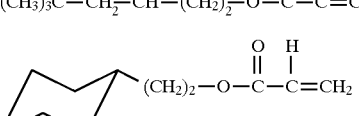 | 6 | (XII) |
| 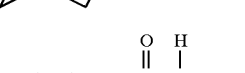 | 7 | (XIII) |
| 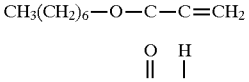 | 8 | (XIV) |
| 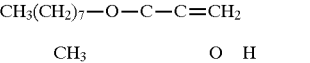 | 9 | (XV) |
| 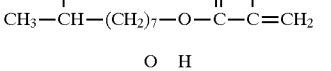 | 10 | (XVI) |
| 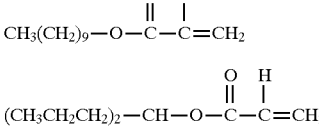 | 4 | (XVII) |
| 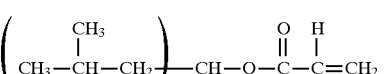 | 4 | (XVIII) |
| 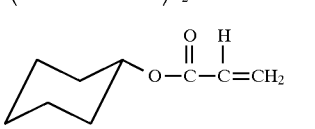 | 4 | (XIX) |

| Monofunctional Compound | Chain Length | Reference |
|---|---|---|
| $CH_3(CH_2)_2-CH(CH_3)-CH(CH_2CH_3)-O-C(=O)-CH=CH_2$ | 5 | (XX) |
| 4-tert-butylcyclohexyl acrylate | 6 | (XXI) |
| $CH_3-CH(CH_3)-(CH_2)_3-CH(CH_3)-O-C(=O)-CH=CH_2$ | 6 | (XXII) |
| $(CH_3)_3C-O-C(=O)-CH=CH_2$ | 2 | (XXIII) |
| $CF_3-(CF_2)_2-CH_2-O-C(=O)-CH=CH_2$ | 4 | (XXIV) |
| $CH_3O-CH(CH_3)-(CH_2)_2-O-C(=O)-CH=CH_2$ | 5 | (XXV) |
| Ph-$(CH_2)_2-O-C(=O)-CH=CH_2$ | 6 | (XXVI) |
| Ph-$O-(CH_2)_2-O-C(=O)-CH=CH_2$ | 7 | (XXVII) |
| $CH_3-CH_2-O-(CH_2)_3-O-C(=O)-CH=CH_2$ | 6 | (XXVIII) |
| $CH_3-(CH_2)_3-O-(CH_2)_2-O-C(=O)-CH=CH_2$ | 7 | (XXIX) |
| $HO-(CH_2)_3-O-C(=O)-C(CH_3)=CH_2$ | 4 | (XXX) |
| $HCF_2-(CF_2)_3-CH_2-O-C(=O)-C(CH_3)=CH_2$ | 5 | (XXXI) |
| $(CH_3)_3C-(CH_2)_2-O-C(=O)-CH=CH_2$ | 4 | (XXXII) |
| $CH_3CH_2-O-C(=O)-C(CH_3)=CH_2$ | 2 | (XXXIII) |
| $CH_3-CH(CH_3)-CH_2-O-C(=O)-C(CH_3)=CH_2$ | 3 | (XXXIV) |
| $CH_3(CH_2)_3-O-C(=O)-C(CH_3)=CH_2$ | 4 | (XXXV) |
| $CH_3(CH_2)_4-O-C(=O)-C(CH_3)=CH_2$ | 5 | (XXXVI) |
| $CH_3(CH_2)_5-O-C(=O)-C(CH_3)=CH_2$ | 6 | (XXXVII) |
| $CH_3(CH_2)_3-CH(CH_3)-CH_2-O-C(=O)-C(CH_3)=CH_2$ | 6 | (XXXVIII) |
| $CH_3(CH_2)_6-O-C(=O)-C(CH_3)=CH_2$ | 7 | (XXXIX) |

Preferred monofunctional compounds include: n—pentyl acrylate (III), 2,4,4trimethylpentyl acrylate (V), n-hexyl acrylate (VII), n-decyl acrylate (XVI), 2-ethylhexyl acrylate (X), 3,5,5-trimethylhexyl acrylate (XI), and 4-tert-butylcyclohexyl acrylate (XXI).

Suitable multifunctional compounds include: 1,6-hexanediol diacrylate (XL), trimethylolpropane triacrylate (XLI), pentaerythritol triacrylate (XLII), pentaerythritol tetraacrylate (XLIII), 1,4-butanediol diacrylate (XLIV), polyacrylated aliphatic polyester oligomers (for example Photomer™ 5018 (tetra-acrylated) from Henkel and Ebecryl™ 1810 (tetra-acrylated) from UCB Radcur), and polyacrylated polyurethane oligomers (for example Ebecryl™ 270 or 8402 (diacrylated) or Ebecryl™ 265 (triacrylated) from UCB Radcur).

A preferred class of multifunctional compounds has the formula $$CH_2=C(R_3)-C(=O)-O-Q-(Z-X-Z)_n-Q-O-C(=O)-C(R_3)=CH_2$$

where n is an integer between 0 and 100, inclusive;

each —$R_3$ is independently —$CH_3$ or —H;

each —Q— is independently alkylene, arylene, or a bond;

each —Z— is independently oxygen, alkylene, hydroxyalkylene, arylene, or a bond;

X is a bond, oxygen, a carbonyl group, an ester group, an ether group, an amide group, an imide group, a carbamate group, a mesogenic group, or $$R_4-(Z-Q-O-C(=O)-C(R_3)=CH_2)_m$$

where m is an integer between 1 and 4, inclusive;
—$R_4$ is a methenyl (≡CH) group, nitrogen, or aromatic nucleus; and
—Z—, —Q—, and —$R_3$ are as previously defined;

subject to the provisos that Q is not a bond when n is 0, Z is oxygen, or either Z or X is a bond; that Z is not oxygen when either Q or Z is a bond; that Z is not a bond when either Q or X is a bond; and that X is not oxygen when Z is oxygen.

Examples of preferred combinations of monofunctional compounds and multifunctional compounds are tabulated in TABLE I below:

TABLE I

| Compound | Type | —R$_2$ Group Chain Length | Amount (wt %) |
|---|---|---|---|
| 3,5,5-Trimethylhexyl acrylate (XI) | Monofunctional | 6 | 44.5 |
| 2-Ethylhexyl acrylate (X) | Monofunctional | 6 | 44.5 |
| Photomer ™ 5018 | Multifunctional | N/A | 10.0 |
| n-Pentyl acrylate (III) | Monofunctional | 5 | 13.5 |
| 2-Ethylhexyl acrylate (X) | Monofunctional | 6 | 35.1 |
| n-Decyl acrylate (XVI) | Monofunctional | 10 | 40.4 |
| Photomer ™ 5018 | Multifunctional | N/A | 10.0 |
| n-Pentyl acrylate ((III) | Monofunctional | 5 | 62.3 |
| n-Hexyl acrylate (VII) | Monofunctional | 6 | 26.7 |
| Photomer ™ 5018 | Multifunctional | N/A | 10.0 |

In a liquid crystal composite (also referred to in the art as encapsulated liquid crystal material or polymer dispersed liquid crystal), discrete volumes of a liquid crystal material are encapsulated, dispersed, embedded or otherwise contained in a matrix material. The volumes are not necessarily limited to spherical or substantially spherical ones. They may be irregularly shaped, and even interconnected. The amount of interconnection between volumes may be to an extent such that the liquid crystal material appears to form a continuous phase. "Liquid crystal material" denotes a composition having liquid crystalline properties, whether that composition consists of a single discrete liquid crystalline compound, a mixture of different liquid crystalline compounds, or a mixture of liquid crystalline and non-liquid crystalline compounds. Preferably, the liquid crystal material is nematic or operationally nematic. More preferably, it also has a positive dielectric anisotropy.

Individual liquid crystal molecules typically have elongated shapes and a tendency to align themselves with their long molecular axes parallel to each other. This alignment causes a liquid crystal composition to be anisotropic, meaning that its physical, optical, and other properties are dependent on the direction of measurement (parallel or perpendicular to the direction of alignment). The alignment direction may be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for light valves. Applications for such light valves includes displays and windows or privacy panels.

Generally the ordinary refractive index of the liquid crystal material is substantially matched to the refractive index of the matrix material. Two indices of refraction are said to be substantially the same, or matched, if they differ by less than 0.05, preferably less than 0.02. A colored visual effect may be obtained by inclusion of dyes, either pleochroic or isotropic, into the composite. The physical principles by which liquid crystal composite light valves operate is described in the art cited in the Background of the Invention section, especially Fergason '047.

The matrix material is preferably a polymeric material. Suitable matrix materials include but are not limited to poly(vinyl alcohol) ("PVA") and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, vinyl polymers, and the like. PVA is a preferred containment medium.

Liquid crystal composites may be made by deposition from an emulsion of the matrix material and the liquid crystal material, in the presence of a carrier medium. The emulsion may be made with apparatus such as propeller blade mixers, colloid mixers, and the like. Preferred emulsion techniques are taught in Fergason, U.S. Pat. No. 4,435,047 (1984), U.S. Pat. No. 4,606,611 (1986), U.S. Pat. No. 4,616,903 (1986), and U.S. Pat. No. 4,707,080 (1987); Pearlman et al., U.S. Pat. No. 4,992,201 (1991); Kamath et al., U.S. Pat. No. 5,233,445 (1993); and Wartenberg et al., U.S. Pat. No. 5,202,063 (1993) and WO 93/18431 (1993); the disclosures of which are incorporated herein by reference.

The monofunctional and multifunctional compounds are photopolymerized by irradiating the emulsion with ultraviolet (UV) light). A conventional UV light source is suitable, but we have generally used a medium pressure mercury vapor lamp having emission peaks at 250, 310, and 360 nm. This emission pattern is found to fit well with the absorption spectrum of a preferred photoinitiator, Darocur™ 4265. Those skilled in the art will appreciate that, for a given UV light source, one particular photoinitiator may be more effective than the others. Typically, irradiation is effected for 15 min at 0° C. under 12 mW/cm$^2$ radiation. The temperature and duration may vary depending on the exact formulation. The promote complete photo-polymerization, the emulsion is stirred during irradiation. Thermal and photo DSC data indicates the degree of cure is greater than 98%.

The photoinitiator helps initiate the polymerization process. Generally, any photoinitiator conventionally used for free-radical polymerizations may be used. Exemplary suitable photoinitiators include: Darocur™ 4265 and 1173 and Irgacur™ 184, 369, 500, 650, and 907, all available from Ciba-Geigy.

After photopolymerization the emulsion may be centrifuged to control droplet size. The resulting pellet from the centrifugation may be re-dispersed in a further matrix material, as disclosed in allowed, commonly assigned copending application no. 08/217581, filed Mar. 24, 1984, of Reamey et al. In this manner, a liquid crystal composite in which the liquid crystal material is encapsulated in plural layers of matrix material may be obtained.

The emulsion is coated onto a substrate, which may have an electrode material partially or entirely covering it. The substrate is typically made of a transparent material such as glass or a transparent polymer such as poly(ethylene terephthalate). If the substrate is electroded, the electrode material also is transparent, made for example of materials such as indium tin oxide (ITO), gold, or silver. (Substrate and/or electrode material to be disposed on a non-viewing side of a light valve need not be transparent.) To prevent coating defects, a coating aid as discussed in the Lau '149 application may be added.

After coating, the carrier medium, which is generally aqueous in nature, is allowed to evaporate. The carrier medium may be water, or an alcohol-water combination, as taught in Wartenberg et al., U.S. Pat. No. 5,202,063 (1993). Once the carrier medium has evaporated, leaving behind the liquid crystal composite, an opposing electrode supported in turn by a second substrate may be laminated on top of the composite to produce a completed light valve which may be switched on and off by the application of an appropriate electric field thereacross.

It is to be understood that while the method of the present invention has been described in a particular sequence of the various steps, i.e., with the photopolymerization taking place before the coating, the method is not limited to such particular sequence and that variations are permissible. For example, the photopolymerization may be performed after the coating step or even after the drying step.

It is believed that the polymerized monofunctional and multifunctional compounds form a shell or capsule wall around liquid crystal material, separating it from the matrix material. The electro-optical performance (e.g., switching voltage, off-state scattering, switching speed, and hysteresis) of a liquid crystal composite is dependent on the nature of the surface interactions between the liquid crystal material and the material immediately surrounding it. This immediately surrounding material may be the matrix material, but a matrix material which is desirable in respect of characteristics such as mechanical properties, protection against environmental contaminants, UV stability, etc. may be undesirable in respect of its surface interactions with the liquid crystal material. Thus, it is desirable to be able to sever the surface interactions from the other characteristics of the matrix material. By introducing an intervening encapsulating material derived from the monofunctional and multifunctional compounds, which has been selected for its interaction characteristics with the liquid crystal material, such severance is possible.

To provide a background for the comparison of the electro-optical properties of liquid crystal composites of this invention against reference liquid crystal composites, a brief discussion of the relevant electro-optical properties and their method of measurement follows:

Optical measurements were obtained with f/3.5 collection optics and a collimated 550±40 nm light source. In order to measure $T_{90}$ and the operating field $V_{90}$ of a liquid crystal composite, samples were stepped up and down in voltage (25 steps up and 25 steps down with 0.7 sec per step) to a relatively high field (typically 8–10 V/$\mu$m). For each test, the maximum in transmission is defined as $T_{on}$, while $T_{off}$ is the percent transmission in the absence of applied voltage. The value $T_{90}$ is given by the equation $$T_{90} = 0.9(T_{on} - T_{off}) + T_{off}$$

The applied field needed to reach $T_{90}$ on the up curve is $V_{90}$ (the up curve being the % T/V curve obtained with increasing voltage). The operating field $E_{90}$ (in Volt/$\mu$m) is defined by $$E_{90} = \frac{V_{90}}{t}$$

where $V_{90}$ is in volts and t is the thickness in $\mu$m of the liquid crystal composite. (It is possible to reduce the voltage needed to operate a liquid crystal light valve by reducing the thickness of the liquid crystal layer. But then properties such as contrast ratio suffer. A fairer measurement is the operating field $E_{90}$, which is normalized for device thickness.)

Hysteresis was measured in a test in which the sample was ramped 25 steps up then 25 steps down in voltage (0.7 sec per step), typically to a maximum voltage which applies the field $E_{90}$ to the film. The hysteresis is defined as $\Delta T/T_{avg}$ at $E_{50(avg)}$ where $E_{50(avg)}$ is the linear average of $E_{50(up)}$ and $E_{50(down)}$. $E_{50(up)}$ and $E_{50(down)}$ are the field needed to reach $T_{50}$ for the up and down curves, respectively. $T_{50}$ is defined by the equation $$T_{50} = 0.5(T_{on} - T_{off}) + T_{off}$$

$\Delta T$ is the difference in transmission between the up and the down curves ($T_{(E50(avg), down)}$ minus $T_{(E50(avg), up)}$) at $E_{50(avg)}$, and $T_{avg}$ is given by $$T_{avg} = \frac{(T_{(E50(avg), down)} + T_{(E50(avg), up)})}{2}$$

Switching speeds were obtained by giving a sample a 1 sec, 400 Hz square wave signal at $E_{90}$. The time for the sample to go from $T_{10}$ to $T_{90}$ is the rise time; the time for the sample to turn off from $T_{90}$ to $T_{10}$ is the fall time. The average switching time is the average of the rise and fall times.

The voltage holding ratio (VHR) of liquid crystal composites was measured as follows. A sample of composite was mounted between two electrodes and a series of alternating polarity voltage pulses was applied. The pulses were 30–300 msec in duration and were applied every 15 msec. During the 15 msec hold time the sample was monitored. The voltage holding ratio (VHR) is defined as the percentage of the original applied voltage which remained at the end of the 15 msec hold time. The measurement was taken at "steady state", which for most samples was attained before 20 pulses. Large values of VHR are more desirable. Practical light valves preferably have a VHR which is at least 70%, more preferably at least 80%, and most preferably at least 90%.

Contrast ratio (CR) is defined by the equation $$CR = \frac{T_{on}}{T_{off}}$$

Because it is very difficult to fabricate light valves having identical thickness of the liquid crystal layer, contrast ratio may be reported normalized for thickness, i.e., CR/thickness.

A figure of merit (FOM) may be defined by the equation $$FOM = \frac{CR}{V_{90} \cdot (f/\#)^2}$$

where f/# is the f-stop and has a value of 3.5. This figure of merit may be used to estimate the overall performance of a light valve, taking into account the operating voltage, the contrast ratio, and the system optics.

A homeotropic transition temperature $T_H$ is the temperature below which the liquid crystal material aligns itself substantially perpendicular to the walls of the encapsulating or matrix material medium, as the case may be, (whereas above such temperature it tends to align itself substantially parallel to the walls). The homeotropic transition temperature may be readily determined because below it, the encapsulated liquid crystal composite becomes substantially clear, i.e., less scattering, even in the absence of an applied electric field. Liquid crystal composite light valves in which $T_H$ is high (e.g., above 60° C.) are not practical devices. $T_H$ and the isotropic temperature ($T_I$) may be measured with an optical microscope equipped with crossed polarizers and a Mettler clearing point apparatus. Samples are heated or cooled at a rate of 2° C./min over the −5° to 95° C. range. Transition temperatures are indicated by the loss of birefringence (scattering) of the sample below $T_H$ or above $T_I$.

Liquid crystal composites made according to this invention are preferably used in active matrix displays, in which each pixel (or picture element) is driven (switched from one visual state to another) by an active switching element such as a thin film transistor ("TFT"), varistor, diode, or metal-insulator-metal element ("MIM"). In one preferred embodiment the active matrix is formed on a silicon wafer. The switching element helps eliminate cross-talk and maintain an initially applied voltage across the corresponding pixel, even when it is not being actively addressed, so that the pixel stays "on" while other pixels are addressed. The longer the pixels holds the initially applied voltage, the longer it can be maintained in the "on" state until it is next addressed, permitting the construction of displays having a larger number of pixels. If the matrix contains a sufficiently large number of switching elements of sufficiently small size, high resolution displays are possible. Active matrix displays are important for television, computer, and instrument screens. Since the voltage attainable with the active matrix drivers presently available for high resolution displays is limited, it is important that the operating field be as low as possible. Thus, the reactive additive formulations of this invention provide an important technical advantage in the making of liquid crystal composites.

The practice of this invention may be further understood by the following examples, which are provided by way of illustration and not of limitation.

EXAMPLE 1

This is a representative procedure for preparing of liquid crystal composites according to this invention and the corresponding light valves. Liquid crystal material (preferably a halogenated nematic liquid crystal, such as the TL— series of liquid crystals from EM Industries) is dissolved in a known amount of a reactive additive formulation at 21° C. until saturation, as indicated by a slight cloudiness of the solution. The solution is emulsified in a 5 to 15 weight % aqueous solution of PVA (e.g., Airvol™ 205 from Air Products). Emulsifying agents other than PVA may be used. Optionally a surfactant or coating aid may be added prior to emulsification. The coating aid may also be added to the final coating emulsion prior to coating. Both the speed and duration of mixing can be adjusted to yield the desired particle size, usually in the range of 1.5 to 2.5 $\mu$m (preferably 2.0 $\mu$m) median volume diameter. The emulsion is adjusted to 40 weight % of non-aqueous components by adding the necessary amount of water, then allowed to defoam by standing for at least 2 hours. After filtering through a 3.0 $\mu$m polycarbonate membrane and storing at approximately 0° C. for at least 30 min, aliquots of the cold emulsion about 8 mL in size are transferred into 30 mL plastic beakers equipped with a magnetic stirrer. Each batch is cooled to about –5° C. by blowing cold nitrogen gas across it with constant stirring for 5 min. The batches are then irradiated with UV light at an intensity of about 12 mW/cm$^2$ for 15 min, while maintaining the temperature at or below 0° C. The emulsion is filtered again through a 5 $\mu$m polycarbonate membrane. The emulsion may be centrifuged if desired to narrow the droplet size distribution. The pellet obtained from the centrifugation is redispersed in another matrix material (e.g., a 50:50 wt % mixture of Neorez™ R967 (a polyurethane matrix) and Airvol™ 205 PVA) to form an emulsion ready for coating.

The coating emulsion is filtered through a 5 $\mu$m membrane and coated onto a back-scribed ITO-electroded glass plate. After air drying, the coated plate is broken into small test cells, each of which is heated for 1 min at 65° C. on a hot plate before lamination with an ITO-glass counterplate. The preferred sample thickness is 7 to 12 $\mu$m, most preferably about 10 $\mu$m.

EXAMPLE 2

Two liquid crystal composite light valves incorporating reactive additive formulations according to this invention are compared against four control light valves, each incorporating a reactive additive formulation not according to this invention. The monofunctional compound component of the reactive additive formulation in each liquid crystal composite is provided in TABLE II below. In each instance, the liquid crystal was TL216 (EM Industries), the multifunctional compound was Photomer™ 5018, and the photoinitiator was Darocur™ 4265.

TABLE II

| Light Valve | Monofunctional Compound | Chain Length | Mole Percent |
| --- | --- | --- | --- |
| 1 | n-Pentyl acrylate (III) | 5 | 20 |
|   | 2-Ethylhexyl acrylate (X) | 6 | 40 |
|   | n-Decyl acrylate (XVI) | 10 | 60 |
| 2 | 2-Ethylhexyl acrylate (X) | 6 | 50 |
|   | 3,5,5-Trimethylhexyl acrylate (XI) | 6 | 50 |
| 3 (control) | n-Pentyl acrylate (III) | 5 | 100 |
| 4 (control) | 2-Ethylhexyl acrylate (X) | 6 | 100 |
| 5 (control) | 3,5,5-Trimethylhexyl acrylate (XI) | 6 | 100 |
| 6 (control) | n-Decyl acrylate (XVI) | 10 | 100 |

Figure 4:
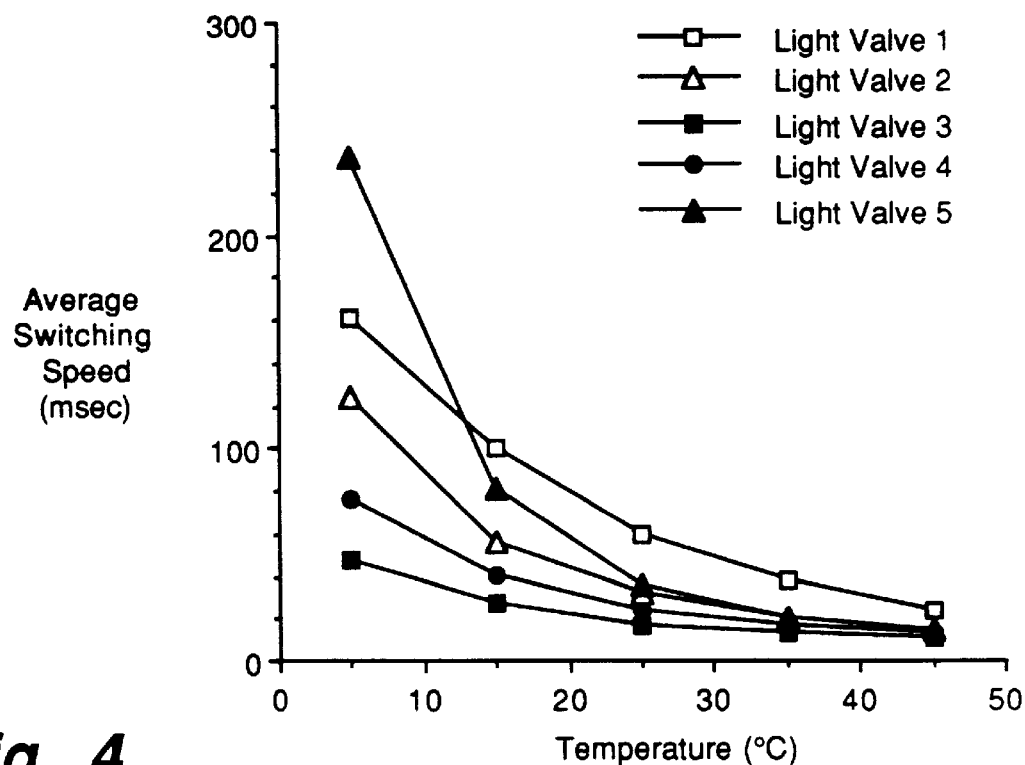

Results are provided in FIGS. 1–4, except for control light valve 6, whose $T_H$ was above 65° C. and whose electro-optical properties therefore were not measured. Each of light valves 1 and 2 has a low $E_{90}$, below 1.0 V/$\mu$m, as shown in FIG. 1. Furthermore, the $E_{90}$'s show little temperature dependence in the 5° to 55° C. range. In comparison, the $E_{90}$'s of the control light valves each has either a high $E_{90}$ or one which is significantly temperature dependent. Yet, the reactive additive formulations do not unacceptably degrade other performance parameters such as contrast ratio (FIG. 2, normalized for thickness), hysteresis (FIG. 3) or switching speed (FIG. 4). In some instances, there is even improvement in the other properties—e.g., light valve 1 in respect of contrast ratio and light valve 2 in respect of hysteresis.

EXAMPLE 3

Figure 5:
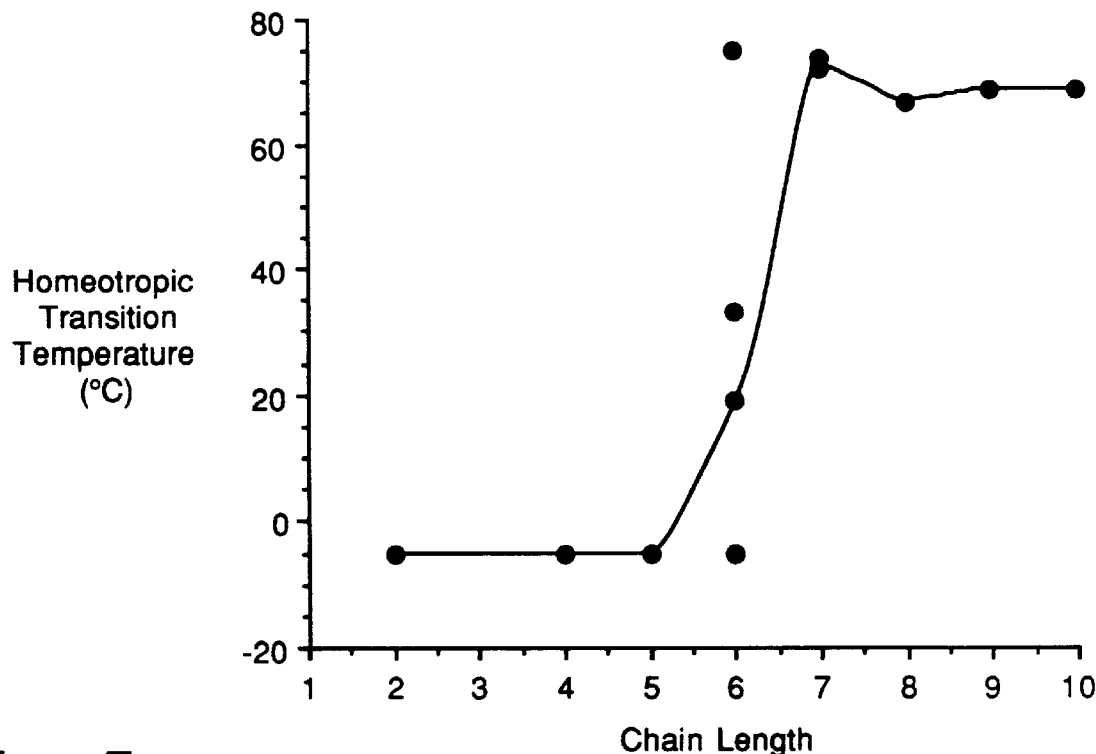
Figure 6:
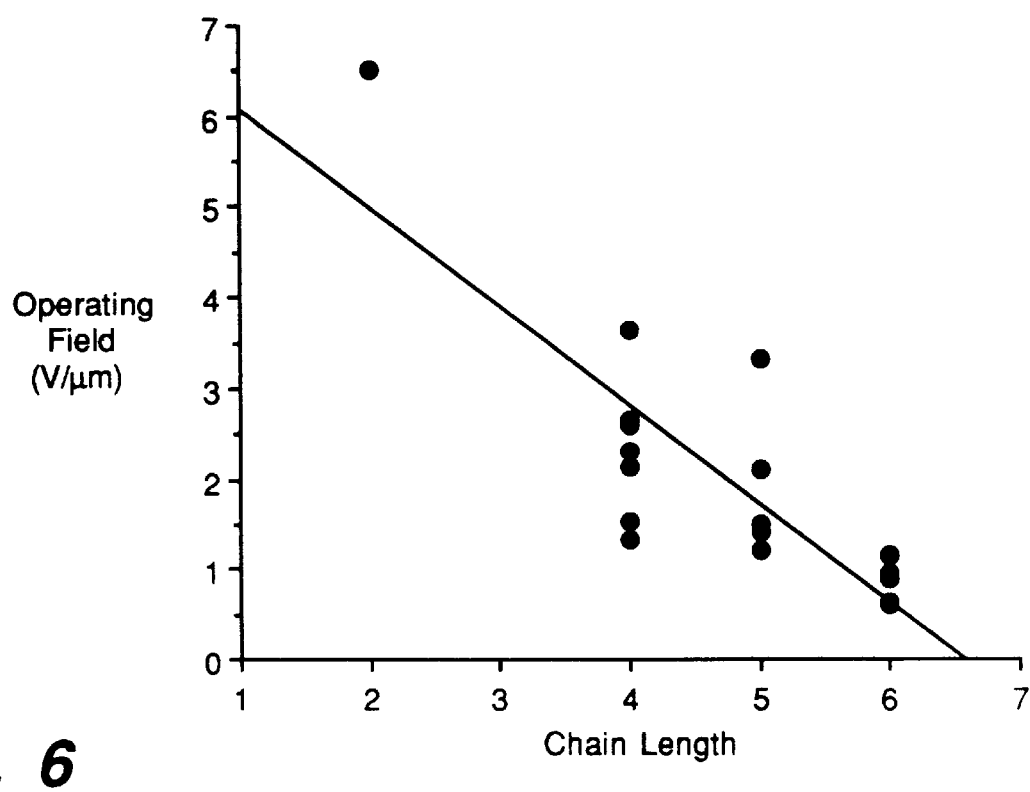

The effect of chain length on the homeotropic transition temperature $T_H$ and operating field $E_{90}$ is illustrated. Liquid crystal composites were prepared with TL205, TL213 or TL216 (EM Industries) as the liquid crystal material, Photomer™ 5018 as the multifunctional compound, and Darocur™ 4265 as the photoinitiator, and monofunctional compounds of varying chain length. Among these were (I), (II), (III), (IV), (V), (VI), (VII), (X), (XI), (XIII), (XIV), (XV), (XVI), (XVII), (XVIII), (XX), (XXIII), (XXXII), and (XXXIII). Light valves were prepared from these composites. The effect of chain length on homeotropic transition temperature $T_H$ and operating field $E_{90}$ is plotted out in FIGS. 5 and 6, respectively. Clearly noticeable in FIG. 5 is a "knee" at chain length equals 6. This unexpected result forms the basis for our invention that by combining monofunctional acrylates with different chain length (or by selecting monofunctional acrylates having the critical chain length of 6), a reduction in $E_{90}$ obtained.

EXAMPLE 4

This example illustrates how a reactive additive formulation according to this invention can be used to improve electro-optical properties. 2-Ethylhexyl acrylate (X) is a generally desirable additive in respect of temperature range, hysteresis, switching speed, and contrast ratio. However, it leads to an operating field $E_{90}$ which is on the high side. By combining it with another acrylate, n-decyl acrylate (XVI), lowered $E_{90}$ is obtained without unacceptably impacting other performance properties. The results for light valves made using a combination of monofunctional compounds (X) and (XVI), with TL216 as the liquid crystal material, is shown in TABLE III following.

properties is obtained. Results are provided in TABLE V for this and other experiments evaluating different multifunctional compounds.

TABLE III

| Monofunctional Compound(s) (molar ratio) | Temperature (°C.) | Calib. $T_{off}$[a] (%) | VHR (%) | $E_{90}$ (V/$\mu$m) | Contrast Ratio per thickness ($\mu$m$^{-1}$) | Hysteresis (%) | Average switching speed (msec) |
|---|---|---|---|---|---|---|---|
| (X)[b] | 5 | 3.1 | 97.1 | 1.09 | 3.25 | 11.2 | 76.7 |
| | 15 | 3.2 | 97.0 | 1.11 | 3.12 | 8.2 | 40.3 |
| | 25 | 3.4 | 96.3 | 1.14 | 2.97 | 8.3 | 24.2 |
| | 35 | 3.7 | 94.9 | 1.14 | 2.71 | 9.5 | 16.2 |
| | 45 | 4.1 | 92.2 | 1.12 | 2.46 | 10.2 | 12.5 |
| (XVI):(X)[c] (1:3) | 5 | 3.0 | 97.2 | 0.80 | 3.21 | 42.1 | 147.4 |
| | 15 | 3.1 | 97.5 | 0.82 | 3.12 | 11.4 | 70.3 |
| | 25 | 3.2 | 97.8 | 0.88 | 2.98 | 7.0 | 37.0 |
| | 35 | 3.4 | 97.6 | 0.93 | 2.82 | 6.9 | 22.5 |
| | 45 | 3.6 | 96.8 | 0.84 | 2.71 | 7.0 | 15.8 |

[a]Transmission obtained directly from an oscilloscope set in the calibration mode.
[b]Loading 18.3 phr; thickness 8.5 $\mu$m.
[c]Loading 18.2 phr; thickness 8.8 $\mu$m.

EXAMPLE 5

In this example, liquid crystal material TL213 is made into a liquid crystal composite, with n-pentyl acrylate (iii) and n-hexyl acrylate (VII) as reactive additives. The multifunctional compound was Photomer™ 5018. The proportions of the two additives were varied. The results, provided in TABLE IV below, show how the relative amounts of the two additives can be varied to achieve a desirable balance of properties.

TABLE IV

| Reference | Loading (phr) | n-pentyl acrylate (mole %) | Thickness ($\mu$m) | Vol. % Median ($\mu$m) | Calib. $T_{off}$ (%) | VHR (%) |
|---|---|---|---|---|---|---|
| A | 21.60 | 52.8 | 13.0 | 2.0 | 1.49 | 93.9 |
| B | 21.40 | 62.7 | 10.2 | 2.0 | 1.96 | 95.1 |
| C | 21.16 | 72.3 | 10.3 | 1.9 | 2.10 | 95.5 |
| D | 20.90 | 81.8 | 10.8 | 2.0 | 1.95 | 95.5 |
| E | 20.70 | 91.0 | 9.9 | 2.0 | 2.09 | 87.7 |
| F | 20.50 | 100.0 | 12.7 | 1.9 | 1.40 | 88.6 |

| Reference | $E_{90}$ (V/$\mu$m) | Contrast Ratio per Thickness ($\mu$m$^{-1}$) | Figure of merit | Hysteresis (%) | Rise Time (msec) | Fall Time (msec) |
|---|---|---|---|---|---|---|
| A | 0.65 | 4.15 | 0.52 | 21.8 | 71.7 | 169.6 |
| B | 0.74 | 4.28 | 0.47 | 15.0 | 54.6 | 108:0 |
| C | 0.84 | 3.92 | 0.38 | 9.9 | 40.6 | 72.3 |
| D | 1.02 | 3.95 | 0.32 | 6.5 | 33.1 | 37.2 |
| E | 1.16 | 3.98 | 0.28 | 6.4 | 28.2 | 32.6 |
| F | 1.22 | 4.42 | 0.30 | 7.3 | 30.6 | 24.1 |

EXAMPLE 6

Multifunctional compound can also improve the electro-optical properties of a liquid crystal composite, as shown in this example using TL216 or TL213 as the liquid crystal material and Neorez™ polyurethane as the matrix material. A liquid crystal composite made with monofunctional compounds (III), (VII), and (XVI) in equimolar amounts produces light valves with low operating field $E_{90}$, but undesirably high hysteresis and slow switching speeds. When multifunctional compound (XLII) is included in the reactive additive formulation, a better balance of electro-optical

TABLE V

| Acrylate Compounds Added | Temperature (°C.) | $E_{90}$ (V/$\mu$m) | Contrast Ratio per Thickness ($\mu$m$^{-1}$) | Hysteresis (%) | Average Switching Speed (msec) |
|---|---|---|---|---|---|
| Monofunctional only[a] | 5 | 0.70 | 3.83 | 31.6 | 167.7 |
| | 15 | 0.62 | 3.62 | 27.9 | 131.3 |
| | 25 | 0.46 | 2.94 | 28.2 | 124.8 |
| | 35 | 0.42 | 2.79 | 23.6 | 100.5 |
| | 45 | 0.46 | 2.84 | 15.1 | 67.4 |
| Monofunctional plus multifunctional[b] | 5 | 0.92 | 3.13 | 17.3 | 154.5 |
| | 15 | 0.82 | 2.74 | 10.6 | 110.2 |
| | 25 | 0.78 | 2.56 | 7.2 | 67.4 |
| | 35 | 0.70 | 2.33 | 5.4 | 80.8 |
| | 45 | 0.61 | 2.22 | 4.2 | 60.1 |
| Monofunctional plus multifunctional[c] | 25 | 0.70 | 1.81 | 6.3 | 100.5 |
| Monofunctional plus multifunctional[d] | 25 | 1.17 | 1.81 | 2.7 | 31.3 |
| Monofunctional plus multifunctional[e] | 25 | 2.28 | 2.31 | 5.1 | 9.9 |
| Monofunctional plus multifunctional[f] | 25 | 1.71 | 2.61 | 3.5 | 16.9 |

[a]TL216 liquid crystal, (III):(VII):(XVI) in 1:1:1 molar ratio, 18.7 phr, thickness 10.0 $\mu$m.
[b]TL216 liquid crystal, (III):(VII):(XVI):(XLII) in 2:2:2:1 molar ratio, 21.6 phr, thickness 10.1 $\mu$m.
[c]TL216 liquid crystal, (III):(VII):(XVI):(XLII) in 2:2:2:1 molar ratio, 21.60 phr, thickness 8.5 $\mu$m.
[d]TL216 liquid crystal, (III):(VII):(XVI):(XLI) in 2:2:2:1 molar ratio, 20.95 phr, thickness 8.9 $\mu$m.
[e]TL213 liquid crystal, (III):(VII):XLII) in 2:3:1 molar ratio, 24.06 phr, thickness 8.3 $\mu$m.
[f]TL213 liquid crystal, (III):(VII):(XLI) in 2:3:1 molar ratio, 25.23 phr, thickness 9.8 $\mu$m.

EXAMPLE 7

This example illustrates the applicability of this invention to a variety of different liquid crystal materials. Besides liquid crystal in the TL— series from EM Industries, data is provided in TABLE IV below for a liquid crystal material in the RY— series from Chisso Corporation. The TL— series liquid crystals contain fluorinated aromatic nuclei, while the RY1017 liquid crystal material used contains cyano groups.

In each instance a mixture of monofunctional compounds (III), (X), and (XVI) was used. The multifunctional compound was Photomer™ 5018.

TABLE VI

| Liquid Crystal Material | VHR (%) | $E_{90}$ (V/μm) | Contrast Ratio per Thickness (μm$^{-1}$) | Figure of Merit | Hysteresis (%) | Rise Time (msec) | Fall Time (msec) |
|---|---|---|---|---|---|---|---|
| TL211[a] | 97.2 | 0.71 | 3.52 | 0.38 | 16.3 | 46.9 | 39.1 |
| TL213[b] | 95.0 | 0.58 | 2.51 | 0.35 | 8.9 | 43.3 | 119.7 |
| TL216[c] | 97.7 | 0.68 | 2.99 | 0.42 | 12.31 | 67.2 | 53.2 |
| RY1017[d] | 83.6 | 0.35 | 1.10 | 0.26 | 20.1 | 51.5 | 53.2 |

[a](III):(X):(XVI) molar ratio 1:1:2, test temperature 25° C.
[b](III):(X):(XVI) molar ratio 4:2:1, test temperature 45° C.
[c](III):(X):(XVI) molar ratio 1:2:2, test temperature 25° C.
[d](III):(X):(XVI) molar ratio 1:2:2, test temperature 65° C.

EXAMPLE 8

This example illustrates the use of methacrylic monofunctional compounds. TL213 was the liquid crystal material, Photometer™ 5018 was the multifunctional compound, and Darocur 4265 was the photoinitiator. The results are provided in TABLE VII.

TABLE VII

| Reference | Monofunctional Compounds (molar ratio) | Loading (phr) | Thickness (μm) | Vol. % Median (μm) | Calib. $T_{off}$ (%) | VHR (%) |
|---|---|---|---|---|---|---|
| A | (III):(XXXVIII) (2:1) | 19.89 | 10.2 | 1.9 | 1.9 | 97.8 |
| B | (III):(XXXVII) (2:1) | 20.54 | 9.8 | 2.0 | 2.0 | 97.0 |
| C | (III):(XXXVIII):(XI) (7:2:1) | 20.03 | 10.1 | 1.9 | 2.0 | 97.8 |
| D | (III):(XXXVII):(XI) (7:2:1) | 20.0 | 9.9 | 1.8 | 2.0 | 97.5 |
| E | (VII):(XXXVI) (1:2) | 19.95 | 10.0 | 1.8 | 2.0 | 96.4 |

| Reference | $E_{90}$ (V/μm) | Contrast Ratio per Thickness (μm$^{-1}$) | Figure of merit | Hysteresis (%) | Rise Time (msec) | Fall Time (msec) |
|---|---|---|---|---|---|---|
| A | 1.52 | 4.32 | 0.23 | 9.8 | 21.3 | 15.9 |
| B | 1.47 | 4.13 | 0.23 | 9.7 | 22.5 | 17.1 |
| C | 1.44 | 4.17 | 0.24 | 8.5 | 23.1 | 16.0 |
| D | 1.67 | 4.14 | 0.20 | 8.3 | 21.7 | 14.8 |
| E | 1.80 | 4.02 | 0.18 | 8.4 | 27.6 | 14.0 |

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A method of making a liquid crystal light composite in which discrete volumes of a liquid crystal material are dispersed in a matrix material and the matrix material and the liquid crystal material are separated from each other by a wall formed by the polymerization of a reactive additive formulation, comprising the steps of:

(a) providing an emulsion comprising plural discrete volumes of a liquid crystal material encapsulated in a matrix material carried in a carrier medium, the emulsion further comprising a reactive additive formulation comprising:
(I) between 83 and 93.3 weight percent of at least two monofunctional compounds of the structure

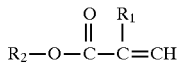

the group —$R_1$ being —$CH_3$ or —H and the group —$R_2$ being an alkyl, aryl, alkylaryl, alkylcycloalkyl, cycloalkylalkyl, hydroxyalkyl, fluoroalkyl, or fluoroaryl group; wherein (A) each group —$R_2$ has a chain length of 6 or (B) at least one group —$R_2$ has a chain length other than six, in which latter event the distribution of chain lengths among the groups —$R_2$ is according to the following table

| Mole Percent | Chain Length |
|---|---|
| 5 to 90 | ≦5 |
| 10 to 95 | >5 | the mole percent's being based on the total amount of monofunctional compounds;

(II) between 5 and 16.9 weight percent of at least one multifunctional compound having acrylic or methacrylic functionality and being derived from diols or polyols containing aliphatic, aromatic, ester, epoxy, amide, imide, carbamate, or mesogenic segments; and (III) between 0.1 and 5.0 weight percent of at least one photoinitiator; the weight percent's being based on the combined amounts of monofunctional compounds, multifunctional compound, and photoinitiator;

(b) photopolymerizing the monofunctional and multifunctional compounds in the reactive additive formulation to form the wall separating the matrix material and the liquid crystal material;

(c) applying a coating of the emulsion onto a substrate; and (d) drying the coating by permitting the carrier medium to evaporate.

2. A method according to claim 1, wherein the at least two monofunctional compounds are selected from the group consisting of n-pentyl acrylate, 2,4,4-trimethylpentyl acrylate, n-hexyl acrylate, n-decyl acrylate, 3,5,5-trimethylhexyl acrylate, 2-ethylhexyl acrylate, and 4-tert-butyl-cyclohexyl acrylate.

3. A method according to claim 1, wherein the at least one multifunctional compound is selected from the group consisting of 1,6hexanediol diacrylate, trimethylolpropane triacrylate, pentaerythritol triacrylate, 1,4-butanediol diacrylate, pentaerythritol tetraacrylate, polyacrylated aliphatic polyester oligomers, and polyacrylated polyurethane oligomers.

4. A method according to claim 1, wherein the multifunctional compound has the structure

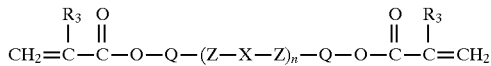

where
n is an integer between 0 and 100, inclusive;
each —R₃ is independently —CH₃ or —H;
each —Q— is independently alkylene, arylene, or a bond;
each —Z— is independently oxygen, alkylene, hydroxyalkylene, arylene, or a bond;
X is a bond, oxygen, a carbonyl group, an ester group, an ether group, an amide group, an imide group, a carbamate group, a mesogenic group, or

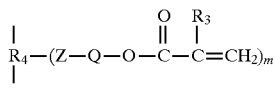

where
m is an integer between 1 and 4, inclusive;
—R₄ is a methenyl (≡CH) group, nitrogen, or aromatic nucleus; and
—Z—, —Q—, and —R₃ are as previously defined;
subject to the provisos that Q is not a bond when n is 0, Z is oxygen, or either Z or X is a bond; that Z is not oxygen when either Q or Z is a bond; that Z is not a bond when either Q or X is a bond; and that X is not oxygen when Z is oxygen.

5. A method according to claim 1, wherein the liquid crystal material is operationally nematic and has a positive dielectric anisotropy.

6. A method according to claim 1, wherein the matrix material is selected from the group consisting of poly(vinyl alcohol) and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, and vinyl polymers.

7. A method according to claim 1, wherein the reactive additive formulation is used in an amount of 5 to 30 parts by weight per 100 parts by weight of liquid crystal material.

8. A method according to claim 1, wherein the liquid crystal material contains a pleochroic dye dissolved therein.

9. A method according to claim 1, further comprising the step of centrifuging the emulsion and re-dispersing the resulting pellet in a further matrix material.

10. A method according to claim 1, wherein the substrate has electrode material partially or entirely covering it.

11. A method according to claim 1, wherein the carrier medium is aqueous.

12. A method according to claim 1, wherein the photopolymerizing step is performed before the coating step.

13. A method according to claim 1, wherein the coating step is performed before the photopolymerizing step.

14. A method according to claim 1, wherein the at least one monofunctional compound is a combination of 3,5,5-trimethylhexyl acrylate and 2-ethylhexyl acrylate and the multifunctional compound is a tetra-acrylated aliphatic polyester oligomer.

15. A method according to claim 1, wherein the at least one monofunctional compound is a combination of n-pentyl acrylate, 2-ethylhexyl acrylate, and n-decyl acrylate and the multifunctional compound is a tetra-acrylated aliphatic polyester oligomer.

16. A method according to claim 1, wherein the at least one monofunctional compound is a combination of n-pentyl acrylate and n-hexyl acrylate and the multifunctional compound is a tetra-acrylated aliphatic polyester oligomer.

17. A composition of matter comprising
(I) between 83 and 93.3 weight percent of at least two monofunctional compounds of the structure

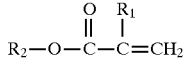

the group —R₁ being —CH₃ or —H and the group —R₂ being an alkyl, aryl, alkylaryl, alkylcycloalkyl, cycloalkylalkyl, hydroxyalkyl, fluoroalkyl, or fluoroaryl group; wherein (A) each group —R₂ has a chain length of 6 or (B) at least one group —R₂ has a chain length other than six, in which latter event the distribution of chain lengths among the groups —R₂ is according to the following table

| Mole Percent | Chain Length |
|---|---|
| 5 to 90 | ≦5 |
| 10 to 95 | >5 | the mole percent's being based on the total amount of monofunctional compounds;

(II) between 5 and 16.9 weight percent of at least one multifunctional compound having acrylic or methacrylic functionality and being derived from diols or polyols containing aliphatic, aromatic, ester, epoxy, amide, imide, carbamate, or mesogenic segments; and (III) between 0.1 and 5.0 weight percent of at least one photoinitiator; the weight percent's being based on the combined amounts of monofunctional compounds, multifunctional compound, and photoinitiator.

18. A composition of matter according to claim 17, wherein the at least two monofunctional compounds are selected from the group consisting of n-pentyl acrylate, 2,4,4-trimethylpentyl acrylate, n-hexyl acrylate, n-decyl acrylate, 3,5,5-trimethylhexyl acrylate, 2-ethylhexyl acrylate, and 4-tert-butylcyclohexyl acrylate.

19. A composition of matter according to claim 17, wherein the at least one multifunctional compound is selected from the group consisting of 1,6-hexanediol diacrylate, trimethylolpropane triacrylate, pentaerythritol triacrylate, 1,4butanediol diacrylate, pentaerythritol tetraacrylate, polyacrylated aliphatic polyester oligomers, and polyacrylated polyurethane oligomers.

20. A composition of matter according to claim 17, wherein the multifunctional compound has the structure

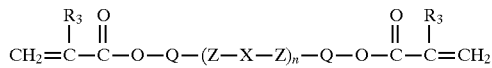

where
n is an integer between 0 and 100, inclusive;
each —$R_3$ is independently —$CH_3$ or —H;
each —Q— is independently alkylene, arylene, or a bond;
each —Z— is independently oxygen, alkylene, hydroxyalkylene, arylene, or a bond;
X is a bond, oxygen, a carbonyl group, an ester group, an ether group, an amide group, an imide group, a carbamate group, a mesogenic group, or

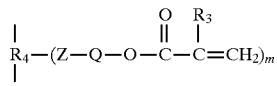

where
m is an integer between 1 and 4, inclusive;
—$R_4$ is a methenyl (≡CH) group, nitrogen, or aromatic nucleus; and
—Z—, —Q—, and —$R_3$ are as previously defined;
subject to the provisos that Q is not a bond when n is 0, Z is oxygen, or either Z or X is a bond; that Z is not oxygen when either Q or Z is a bond; that Z is not a bond when either Q or X is a bond; and that X is not oxygen when Z is oxygen.

* * * * *